Figures 1, 2:
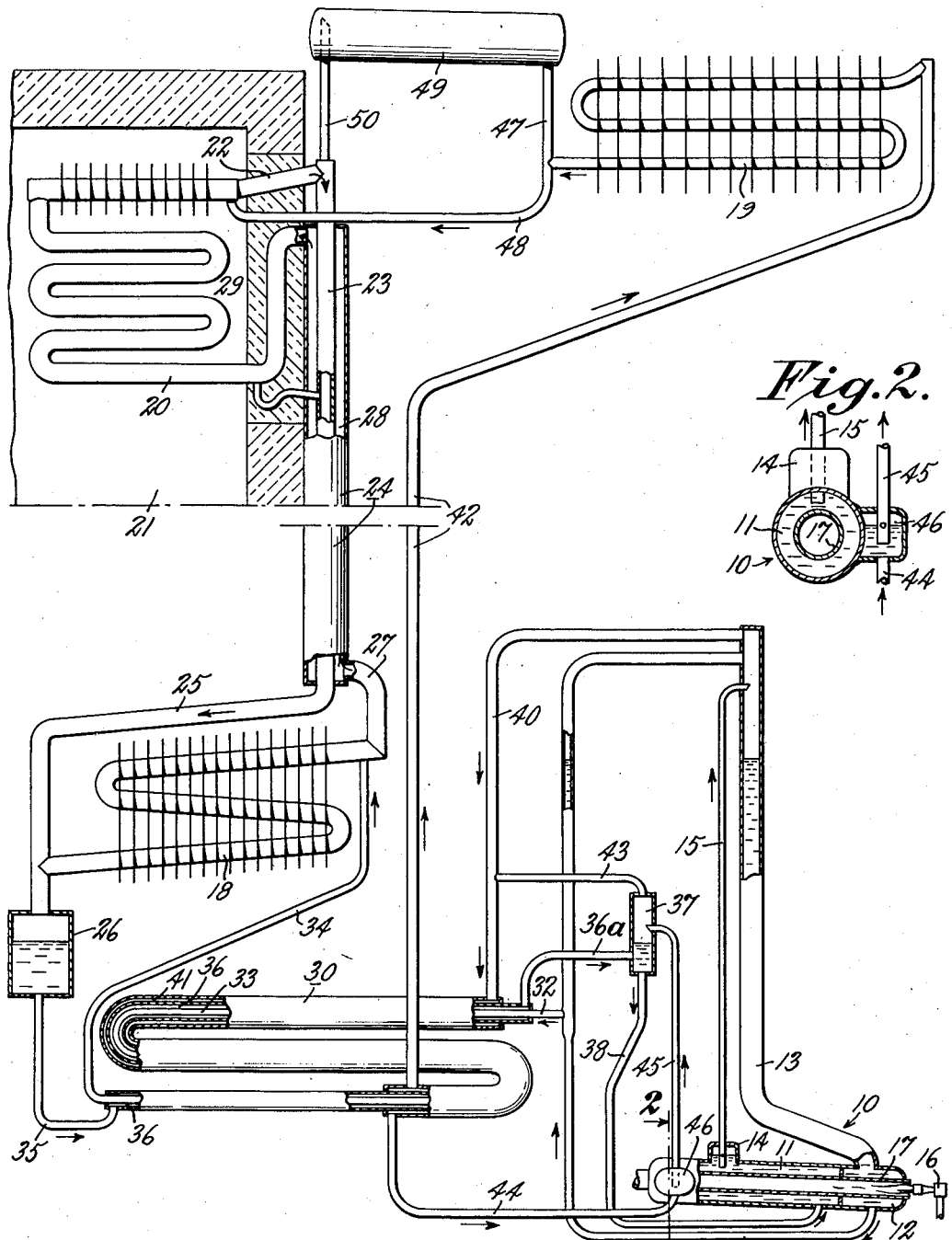

Feb. 27, 1940.   H. M. ULLSTRAND   2,191,550
REFRIGERATION
Filed April 7, 1938

INVENTOR.
Hugo M. Ullstrand
BY
D. E. Heath
his ATTORNEY.

Patented Feb. 27, 1940

2,191,550

UNITED STATES PATENT OFFICE 2,191,550

REFRIGERATION

Hugo M. Ullstrand, Evansville, Ind., assignor to Servel, Inc., New York, N. Y., a corporation of Delaware Application April 7, 1938, Serial No. 200,571

4 Claims. (Cl. 62—119.5)

My invention relates to an absorption type refrigeration system and it is an object of the invention to provide a system of this type having greater efficiency.

Fig. 1 of the drawing shows more or less diagrammatically an absorption refrigeration system of a type making use of an auxiliary pressure equalizing fluid. Fig. 2 is a detail sectional view on line 2—2 in Fig. 1.

A generator 10 comprises a horizontal portion divided into chambers 11 and 12 and an upright portion or standpipe 13. The lower end of standpipe 13 is connected to chamber 12. Chamber 11 is provided with a dome 14. A thermosyphon or vapor liquid lift conduit 15 is connected from chamber 11 to the upper part of standpipe 13. The lower end of conduit 15 extends downward through the dome 14 into chamber 11. The generator is heated by a gas burner 16 arranged so that the flame is projected into the lower end of a flue 17 which extends through the horizontal portion of the generator.

An absorber 18 comprises a pipe coil provided with heat transfer fins for cooling by air. A condenser 19 also comprises a pipe coil provided with heat radiation fins. An evaporator 20 comprises a pipe coil located in a thermally insulated refrigerator compartment 21.

The upper end of evaporator 20 is connected by a conduit 22, inner passage 23 of a gas heat exchanger 24, and a conduit 25 to the lower end of absorber 18 and the upper part of a vessel 26, referred to as an absorber sump or vessel. The upper part of absorber 18 is connected by a conduit 27, outer passage 28 of the gas heat exchanger, and a conduit 29 to the lower end of evaporator 20.

The generator 10 and absorber 18 are interconnected by members including a triple heat exchanger 30. Chamber 12 of generator 10 is connected by a conduit 31, a conduit 32, inner passage 33 of heat exchanger 30, and conduit 34 to the upper end of absorber 18. The lower end of absorber 18 is connected by the conduit 25 to the upper part of vessel 26. The lower part of absorber vessel 26 is connected by a conduit 35, middle passage 36 of heat exchanger 30, a conduit 36a, a vessel 37, and a conduit 38 to chamber 11 of the generator 10. The upper end of conduit 31 is connected to the upper part of the standpipe 13.

The upper end of standpipe 13 is connected to the upper end of condenser 19 by a conduit 40, outside passage 41 of heat exchanger 30, and conduit 42. The upper end of vessel 37 is connected by a conduit 43 to conduit 40. The lower end of outside passage 41 of heat exchanger 30 is connected to the upper part of vessel 37 by a conduit 44, a chamber 46, and a thermosyphon or vapor liquid lift conduit 45. The lower end of conduit 45 projects downward into chamber 46. Chamber 46 is formed on the outside of chamber 11 of the generator 10, as better seen in Fig. 2.

The lower end of condenser 19 is connected by a conduit 48 to the upper end of evaporator 20. The lower end of condenser 19 is also connected by a conduit 47, a gas accumulation vessel 49, and a conduit 50 to the inner passage 23 of gas heat exchanger 24.

The system contains a suitable refrigerant such as ammonia, a liquid absorbent such as water, and an auxiliary pressure equalizing fluid such as hydrogen. As shown, the absorber 18 and condenser 19 are directly cooled by air. The absorber and condenser may be otherwise cooled, as by circulating water or by vaporization-condensation heat transfer circuit. Instead of a gas burner 16, other suitable means may be used for heating the generator, such as an electric heating element or a liquid fuel burner. The heater for the generator may be controlled by a thermostat, not shown, responsive to a temperature condition affected by the evaporator 20.

In operation, heat applied to the generator 10 by the burner 16 causes expulsion of ammonia vapor out of solution. Vapor expelled from solution in chamber 11 accumulates in dome 14 and rises through conduit 15, causing upward flow of liquid through this conduit by thermosyphon or vapor liquid lift action into the upper end of standpipe 13. Vapor expelled from solution in chamber 12 and standpipe 13 rises through liquid to the upper end of the standpipe. Vapor flows from the upper end of standpipe 13 through previously described connections to the upper end of condenser 19.

Ammonia vapor condenses to liquid in condenser 19 and flows through conduit 48 into the upper end of evaporator 20. Liquid ammonia flows downward in evaporator 20, evaporating and diffusing into hydrogen, producing a refrigerating effect. The resulting mixture of hydrogen gas and ammonia vapor, referred to as rich or strong gas, flows from the upper end of evaporator 20 through previously described connections to the lower end of absorber 18.

Weakened absorption liquid flows from generator chamber 12 through previously described connections to the upper end of absorber 18. This weak solution flows downward in absorber 18, absorbing ammonia vapor out of the rich gas. The resulting weak or poor gas returns through previously described connections to the lower end of evaporator 20. Enriched absorption liquid flows from the lower end of the absorber 18 into absorber vessel 26 and thence through previously described connections to chamber 11 of generator 10.

The gas storage vessel or pressure vessel 49 contains a quantity of hydrogen, the auxiliary fluid, which is displaced through conduit 50 into the gas circuit to cause increase in the partial pressure of hydrogen in this circuit upon increase in total pressure in the system under high room temperature conditions, as known.

Weak solution flowing through inner passage 33 of heat exchanger 30 gives up heat to strong solution flowing in the opposite direction in the middle passage 36. Vapor from the generator flowing in outside passage 41 of the heat exchanger 30 also gives up heat to strong solution flowing in the opposite direction in middle passage 36.

Transfer of heat from the vapor is accompanied by condensation in the outside passage 41. This condensation effects removal of water vapor accompanying ammonia vapor from the generator and is referred to as rectification. The condensate flows downward in the outside passage 41 into conduit 44 and chamber 46. Chamber 46 is heated indirectly, transfer of heat thereto being through liquid contained in chamber 11 of the generator. Vapor which is formed in chamber 46 by heating of condensate therein accumulates in the upper part of chamber 46 and causes upward flow of liquid through conduit 45 by thermosyphon or vapor lift action whereby condensate from the outside passage 41 of the heat exchanger 30 is raised into vessel 37. The condensate joins rich solution in vessel 37 and is returned therewith through conduit 38 to the generator chamber 11.

Circulation of the gas through and between the evaporator 20 and absorber 18 is caused in a known manner by difference in specific weights of the rich and weak gas. The described flow of weak solution from the generator to the absorber occurs by gravity. The surface level of liquid in standpipe 13 is high enough so that liquid overflows from the upper end of conduit 34 into the upper end of absorber 18. The described flow of strong solution takes place by thermosyphon or vapor lift action in conduit 15. Strong solution stands in absorber vessel 26 and vessel 37 at substantially the same levels which are sufficiently above the lower end of conduit 15 so that the column of vapor and liquid formed in conduit 15 extends to the upper end of this conduit and overflows into the upper end of stand pipe 13.

The triple heat exchanger 30 is located below the surface levels of liquid in the generator and absorber so that the liquid passages thereof are flooded with weak and strong solution flowing in opposite directions. It is therefore necessary to raise the condensate formed in outside passage 41 above the surface level of liquid in the system to keep the passage 41 free for flow of vapor and to return the condensate into the liquid circuit. This is accomplished by the auxiliary vapor lift or thermosyphon provided by conduit 44, chamber 46, and conduit 45 through which condensate is raised into vessel 37 above the surface level of strong solution therein.

Various changes and modifications may be made within the scope of the invention as set forth in the following claims.

What is claimed is:

1. A refrigeration system containing refrigerant and liquid absorbent for the refrigerant, and having a generator, means for heating said generator, an absorber, a rectifier, a thermosyphon or vapor liquid lift for causing circulation of fluid between said generator and absorber, and a second thermosyphon or vapor liquid lift for causing circulation of fluid between said generator and rectifier, said second thermosyphon or vapor liquid lift being arranged to receive heat by transfer through liquid in the system.

2. A refrigeration system as set forth in claim 1 also having a liquid heat exchanger connected between said generator and absorber, said rectifier being in heat exchange relation with said heat exchanger.

3. A refrigeration system as set forth in claim 1 in which heat from said generator heating means is transferred to said second thermosyphon or vapor liquid lift by transfer through liquid in said generator.

4. In an absorption refrigeration system, having a circuit for absorption liquid, the combination with a rectifier of a heated vessel and a rising conduit having its lower end projecting into said vessel, said vessel being heated by transfer thereto of heat through liquid in the system, said rectifier being above said vessel and connected thereto for flow of liquid condensate from the rectifier into said heated vessel, said combination being connected in said system so that said rectifier is located below the upper level of absorption liquid in said circuit and liquid and vapor rise through said conduit and return to their respective paths of flow in the system.

HUGO M. ULLSTRAND.